(12) United States Patent
Nahum et al.

(10) Patent No.: US 6,668,109 B2
(45) Date of Patent: Dec. 23, 2003

(54) METHOD AND SYSTEM FOR ULTRA-FAST SWITCHING OF OPTICAL SIGNALS

(75) Inventors: Assaf Nahum, Rehovot (IL); Atzmon Ofri, Qiryat Eqron (IL); Eliezer Ben-Gad, Merkaz (IL); Igor Kovalski, Givatayim (IL)

(73) Assignee: Teraop Inc., DE (US)

( * ) Notice: Subject to any disclaimer, the term of this patent is extended or adjusted under 35 U.S.C. 154(b) by 162 days.

(21) Appl. No.: 09/862,958

(22) Filed: May 22, 2001

(65) Prior Publication Data

US 2002/0057863 A1 May 16, 2002

Related U.S. Application Data

(60) Provisional application No. 60/230,700, filed on Sep. 7, 2000.

(51) Int. Cl.[7] .................................................. G02B 6/26
(52) U.S. Cl. ........................... 385/18; 385/16; 385/17; 385/40
(58) Field of Search ................................ 385/8, 16, 17, 385/18, 19, 31, 39, 40, 4, 15, 25

(56) References Cited

U.S. PATENT DOCUMENTS

| | | | |
|---|---|---|---|
| 4,933,944 A | 6/1990 | McGraw | 372/18 |
| 4,935,931 A | 6/1990 | McGraw | 372/18 |
| 5,070,260 A | 12/1991 | Wong | 359/330 |
| 5,177,633 A | 1/1993 | Wong | 359/330 |
| 5,408,556 A | 4/1995 | Wong | 385/48 |
| 5,457,556 A | 10/1995 | Shiragaki | 359/117 |
| 5,715,337 A | 2/1998 | Spitzer et al. | 385/4 |
| 5,872,880 A | 2/1999 | Maynard | 385/88 |
| 5,937,117 A | 8/1999 | Ishida et al. | 385/24 |
| 6,038,058 A | 3/2000 | Robinson et al. | 359/293 |
| 6,075,239 A | 6/2000 | Aksyuk et al. | 250/229 |
| 6,088,145 A | 7/2000 | Dickensheets et al. | 359/196 |
| 6,097,859 A | 8/2000 | Solgaard et al. | 385/17 |
| 6,154,587 A | 11/2000 | Okayama | 385/24 |
| 6,198,565 B1 * | 3/2001 | Iseki et al. | 359/224 |
| 6,205,267 B1 | 3/2001 | Aksyuk et al. | 385/19 |
| 6,222,954 B1 | 4/2001 | Riza | 385/18 |
| 6,259,835 B1 | 7/2001 | Jing | 385/18 |
| 6,288,807 B1 | 9/2001 | Wu et al. | 359/122 |
| 6,288,821 B1 * | 9/2001 | Aksyuk et al. | 359/245 |
| 6,317,529 B1 | 11/2001 | Kashima | 385/16 |
| 6,522,802 B2 * | 2/2003 | Hoen | 385/18 |
| 2001/0008457 A1 | 7/2001 | Jing | |

OTHER PUBLICATIONS

Press Release: OMM MEMS–based Optical Switches Pass Rigorous Telcordia Requirements. www.omminc.com (Jul. 16, 2001).

(List continued on next page.)

*Primary Examiner*—Edward J. Glick
*Assistant Examiner*—Therese Barber
(74) *Attorney, Agent, or Firm*—Mark M. Friedman

(57) ABSTRACT

The system can include one or more optical switching devices. Each optical switching device can achieve relatively high switching speeds such as between thirty (30) nano-seconds to fifty (50) nano-seconds with precise angular movement. The switching speed can be defined as the movement of an optical element from a first switching position to a second switching position. The relatively high switching speeds and precise angular movement of the optical element can be attributed to utilizing a combination of electrodes and membrane supports made from predefined materials that react to the electrodes. The optical switching device can be a microelectromechanical system (MEMS) device that can be fabricated by the adding or etching layers of materials such as in photolithography manufacturing techniques. The optical element can include a mirror made from reflective materials such as a layer of gold. The membrane supports can include planar strips fabricated from silicon based materials such as silicon nitride ($Si_3N_4$).

25 Claims, 8 Drawing Sheets

OTHER PUBLICATIONS

Press Release: A World's First for Optical Switching: Live Data Traffic Switched by MEMS–bsaed Optical Switch Subsystems Delivered by OMM Inc. www.omminc.com (Mar. 26, 2000).

Press Release: Optical switches delivered by Optical Micro Machines Inc. (OMM) at the core of Siemens' Transxpress™ optical service node. Siemens demonstrates optical switching at CeBIT 2000 using optical switching subsystems from OMM Inc. www.omminc.com (Mar. 7, 2000).

Press Release: Revolutionary MEMS Optical Switch Slated to Become the Heart of Optical Communications Systems. www.omminc.com (Dec. 9, 1999).

Press Release: OMM Focuses Market Position on Mid–sized MEMS Photonic Switch Modules and Subsystems. www.omminc.com (Jul. 27, 2001).

* cited by examiner

METHOD AND SYSTEM FOR ULTRA-FAST SWITCHING OF OPTICAL SIGNALS

STATEMENT REGARDING RELATED APPLICATIONS

This application claims priority to U.S. Provisional Application No., 60/230,700, entitled, "Ultra Fast Optical Switch," filed Sep. 7, 2000.

TECHNICAL FIELD

This invention relates generally to optical networks. More particularly, the present invention relates to ultra-fast optical switches within an optical network.

BACKGROUND OF THE INVENTION

In recent years, the exponential growth in computing power has been paralleled with an explosion in demand for communication bandwidth. One key element of this bandwidth explosion has been optical wave guides or optical fiber links, which have enabled bit rates far higher than were possible using conventional copper cables.

To achieve high bit rates, optical switches are used in many conventional optical networks. Conventional switches typically rely on electronic cores, which convert optical signals to electronic signals. Electronic circuits and the switch core then direct the electronic signals to a desired output port. A final electrical-to-optical conversion is performed to transform the signal back into light for propagation of the optical signal along the optical wave guides of a network. One major problem with electronic circuits used for switching is that they do not scale well to large port counts and are costly to replace for network upgrades to support higher data rates needed for the growing demand for bandwidth.

Microelectromechanical systems (MEMS) can substantially reduce or eliminate the problems associated with electronic circuits. MEMS technology comprises complex machines so small that the systems are typically measured in microns. MEMS devices typically combine electronic circuitry with mechanical structures to perform specific tasks. For optical switches, the key mechanical components are MEMS-based micro-machined mirrors fabricated on silicon chips using well established, varied-large-scale integration (VLSI) complimentary metal-oxide semiconductor (CMOS) foundry processes. These processes can include, but are not limited to, photolithography, material deposition, and chemical etching.

Because of the reliability and extremely compact design of MEMS optical switching devices, these devices can be integrated easily into a variety of systems such as instrumentation and communication applications. Instrumentation applications include, but are not limited to, air bag sensors, pressure sensors, displays, adaptive optics, scanners, printers, data storage and micro-fluidics. Communication applications include, but are not limited to, packet switching, optical cross connect (OXC), optical add-drop multiplexers (OADMs), optical network protection, and optical network restoration. Specific applications for OADMs include: linear add-drop for backbone dense wave division multiplexing (DWDM) networks, hubbed rings and metro access networks, and logical mesh rings that allow dynamic path reconfiguration based on bandwidth across a network.

In addition to the general MEMS optical switching device applications noted above, there are also specific MEMS optical switch device applications. For example, at least two specific MEMS optical switching designs exist today: the (a) two-dimensional (2-D) or digital approach and (b) three-dimensional (3-D) or analog approach (2N architecture). Both optical switching architectures operate on a few basic principles: an MEMS optical switch routes optical signals from one optical wave guide to another. The routing can be accomplished by steering the light, reflecting the light off a moveable mirror, and redirecting the light back into one of N possible output ports.

While the operating principles of MEMS optical switching devices may appear to be simple, problems exist with conventional MEMS optical switching devices because of the need for precision control of a moveable optical element in a high speed environment. In other words, conventional MEMS optical switching devices lack precise and controlled movement of mirrors used to reflect optical signals originating from one optical wave guide and transmitted to another optical wave guide.

This lack of precise and controlled movement of the optical element in a MEMS optical switching device can be attributed to the low forces that are used to move the optical element. Typically, conventional MEMS optical switches utilize electrostatic methods to induce movement of an optical element. Electrostatic methods rely on the attraction of oppositely charged mechanical elements. Conventional optical switches typically use a single electrode to pull a structure having an electrical charge of opposite sign to the electrode.

Single electrode actuators do not provide for precise and controlled movement of the deflecting or moving structure. For optical switch applications in which it is desirable to merely rotate the optical element or mirror, the single electrode actuation usually produces a moment and a force. When a moment and a force is produced, translational movement of the deflecting structure is produced. This translational movement is undesirable when the optical element or mirror is designed to be simply rotated about an axis.

Accordingly, there is a need in the art for an optical switching device that generates pure moments to move or rotate a respective optical element such as a mirror. A further need in the art exists for an optical switching device that can produce moments for rotating a respective optical element with increased precision and control as well as increased repeatability. Another need exists in the art for an optical switching device that can also increase the speed and precision at which optical signals are switched within an optical network. Another need exists in the art for an optical switching device that operates with uniformly low insertion loss, low operating power, and less than millisecond switching time. A further need exists in the art for an optical switching device that provides for uniform optical element positioning and registration, as well as resistance to shock and vibration. Another need exists in the art for an optical switching device that can be produced in high volumes by utilizing proven semiconductor process technology. And lastly another need exists in the art for an optical switching device that can support widely varying data rates, modulation formats, and optical signal wave lengths.

SUMMARY OF THE INVENTION

The present invention solves the problems of conventional optical networks by providing an optical switching device that can increase the speed and precision at which optical signals are switched within an optical network. The present invention can comprise a system of one or more optical switching devices. Each optical switching device can achieve relatively high switching speeds such as between thirty (30) nano-seconds to fifty (50) nano-seconds or lower than thirty nano-second speeds with precise angular movement. The switching speed can be defined as the movement of an optical element from a first switching position to a second switching position. A switching position can be defined as a position in which electrodes are applying a voltage to maintain membrane supports and an optical element at a predefined location. The relatively high switching speeds and precise angular movement of the optical element can be attributed to utilizing a combination of electrodes and membrane supports made from predefined materials that react to the electrodes.

More specifically, the optical switching device can comprise a optical element, one or more membrane supports which carry the optical element, and upper and lower electrodes that control the deflection of the one or more membrane supports. The optical switching device can comprise a microelectromechanical system (MEMS) device that can be fabricated by the adding or etching layers of materials such as in photolithography manufacturing techniques. The optical element can comprise a mirror made from reflective materials such as a layer of gold. The membrane supports can comprise planar strips fabricated from thin layered materials such as silicon nitride ($Si_3N_4$). And the upper and lower electrodes can be electrical conductors made from materials such as titanium nitride (TiN).

Because of the materials used for the membrane supports, the membrane supports can be manufactured with relatively high tensile stresses. A membrane support with high stresses can be easily stabilized and is thus suitable for supporting an optical element which is formed on a respective surface of a membrane support. Further, a membrane support with high stresses typically has increased stiffness so that it can provide rapid reaction of the optical element. The optical element typically moves in unison with the membrane support since it is usually firmly attached to the membrane support and because the membrane support has sufficient stiffness such that the optical element will not lag behind any movement of the membrane support. The stiffness of the membrane support can also reduce or prevent low modes of vibration from occurring in the optical element after moving the optical element to a switching position.

In addition to providing membrane supports with high stresses, the present invention can also provide a method and system for switching optical signals that employs multiple forces, as opposed to a single force, to move the optical element into a switching position. More specifically, the present invention employs substantially pure moments to rotate the membrane supports and the optical element from a rest position to a switching direction. The substantially pure moments can be generated by activating opposing upper and lower electrodes that deflect individual membrane supports of respective pairs of membrane supports. In this way, undesirable translational movement of the membrane supports and optical element can be substantially reduced or eliminated, which, in turn, increases the precision of the angular movement of the membrane supports and optical element.

According to another aspect of the present invention, a plurality of optical switching devices may be provided on a single planar surface to form a planar array of optical switching devices having multiple columns. More specifically, a plurality of optical switching devices can be aligned into an linear array. Each optical switching device of the linear array can have a unique orientation to provide a unique switching direction relative to the remaining optical switching devices within the linear array. Then, multiple linear arrays can be placed adjacent to each other, such as in columns, to form the larger planar array. The larger planar array can also be referred to as a die. Each linear array of the larger planar array or die can be assigned to a specific, individual information port. The number of information ports serviced is dependent upon the number linear arrays provided. The number of linear arrays provided, and hence the number of information ports serviced, can be in the range from thirty-two (32) to two-hundred-fifty-six (256) ports or more, depending upon the application of the planar array or die.

DETAILED DESCRIPTION OF EXEMPLARY EMBODIMENTS

Figure 1:
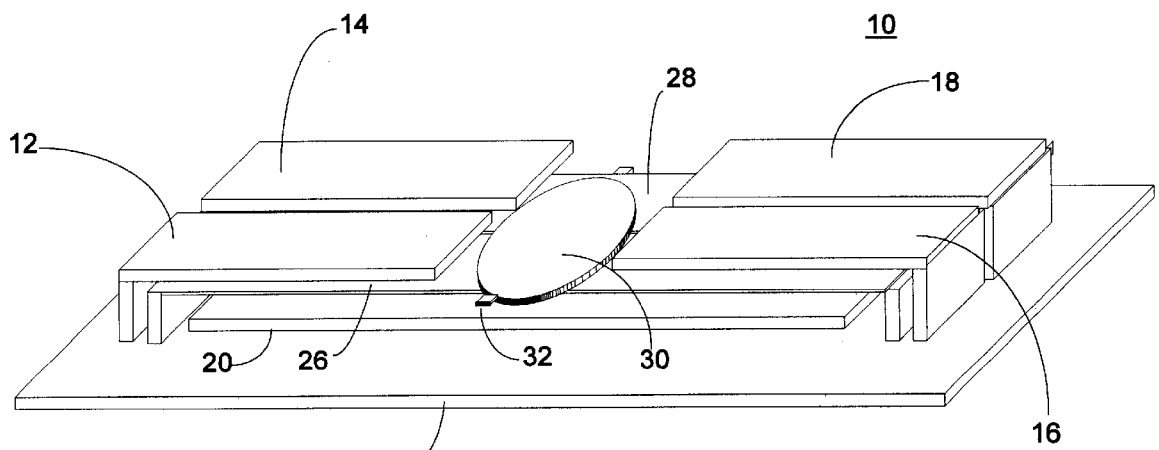
FIG. 1 is a perspective view of an optical switching device according to the present invention.

With the present invention, ultra-fast switching of optical signals can be achieved with relative ease. That is, the optical switching device of the present invention can provide precise movement of an optical element, such as a mirror in a high speed switching environment. The optical switching device or the present invention can rotate the optical element by generating simple and pure moments. The optical switching device of the present invention can have at least two mechanically defined positions that facilitate very accurate and repeatable movement. The optical switching device of the present invention can form the building blocks for one or more linear optical switching arrays. In turn, one or more linear optical arrays can form more complex switching architectures. For example, two-dimensional switching architectures and three-dimensional switching architectures can comprise one or more of the optical linear arrays of the present invention.

Referring now to the drawings, in which like numerals represent like elements throughout the several figures, aspects of the present invention and the preferred operating environment will be described.

Figure 3:
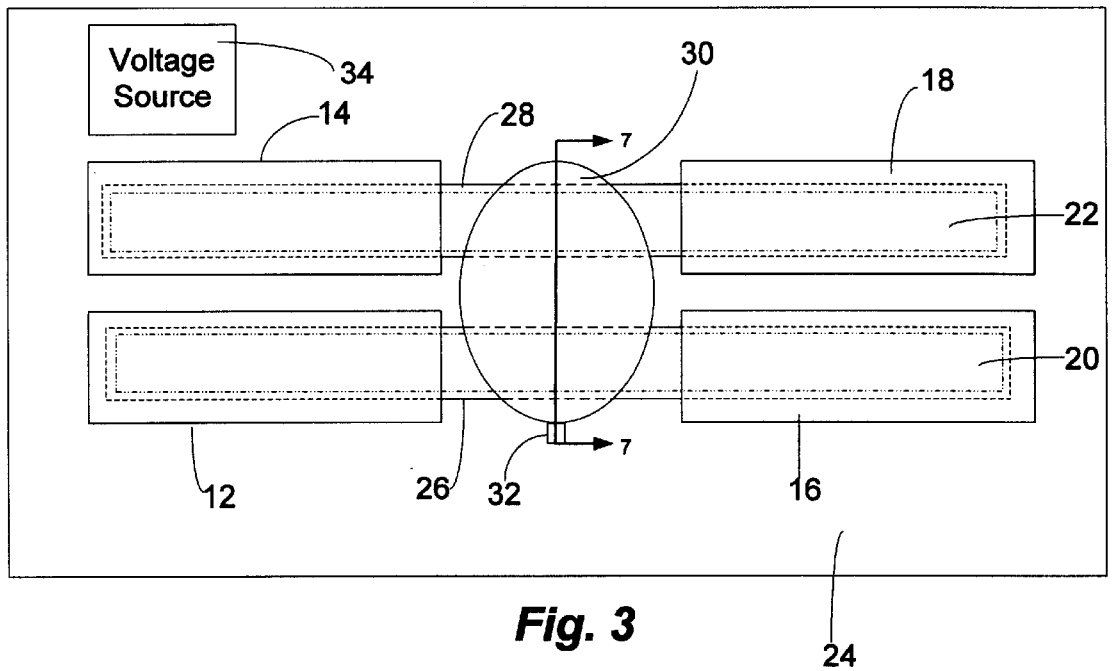
FIG. 3 is an elevational view of the optical switching device illustrated in FIG. 1.

FIG. 1 illustrates an exemplary optical switching device 10 that includes electrodes 12, 14, 16, and 18 spaced from a substrate 24. Two electrodes 20, 22 are disposed adjacent to or within a substrate 24 (electrode 22 disposed within the substrate 24 is illustrated in FIG. 3 with dashed lines.) While sets of three electrodes on a side of an optical element 30 can be connected to the same side of the power supply 34, each electrode can be controlled individually or in predetermined groupings. For example, to produce a moment or couple as will be discussed below, opposing sets of electrodes can be activated. In one exemplary embodiment, two electrodes on a same side and above a membrane support 28 such as two electrodes 14 and 18 can be activated at the same time as a diagonally opposed electrode disposed adjacent to the substrate 24 such as electrode 20.

A first membrane support 26 and a second membrane support 28 are positioned between the substrate electrodes 20, 22 and the other electrodes 12, 14, 16, and 18. The membrane supports 26, 28 can be connected to a side of the power supply 34 in order to close the circuit and build the electrostatic forces upon activation. The membrane supports 26, 28 space or separate an optical element 30 from the substrate 24.

The optical element 30 can comprise a mirror made from reflective materials such as a layer of gold. The optical element 30 can also be referred to as a micro-mirror that is of the tilting mirror variety. However, the optical element 30 is not limited to mirrors and can include other optical elements such as a lens and other like structures that manipulate optical signals. As noted above, the optical element in the micro-mirror embodiment can be made from a layer of gold. However, other reflective materials include, but are not limited to, aluminum and other like reflective coatings.

Optical parameters for the exemplary micro-mirror embodiment of the present invention are listed in table 1. Table 1 summarizes the optical parameters for the micro-mirror exemplary embodiment.

TABLE I

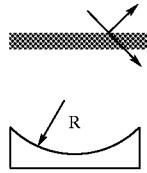

Optical Parameters

| Description | | Dim + Tol | Remarks |
|---|---|---|---|
| Reflectiveness | | 99% | @ 1.55 (Gold) |
| Power | | R > 0.14 m | |

In this exemplary embodiment, as listed in the Table 1, the radius of curvature for the micro-mirror is ±0.1 m. The reflectivity of light from the micro-mirror is preferably better than 99%. The center operational wave length of the micro-mirror is preferably 1550±20 nm. However, the present invention is not limited to these optical parameters described and listed in Table 1. Those skilled in the art will appreciate that these parameters can be adjusted for specific applications for the optical switching device 10.

The shape of the optical element 30 in one exemplary embodiment can have a substantially circular shape. However other shapes are not beyond the scope of the present invention. Other shapes include, but are not limited to, elliptical, square, rectangular, and other like shapes. The shape of the optical element 30 will often be dictated by its corresponding application. That is, the shape of the optical element 30 may be dependent upon the amount and type of optical wave guides that are feeding and receiving optical signals to and from the optical element 30. In one exemplary embodiment where the optical element 30 is a mirror, one of the important parameters is the power of the mirror 30. The power of the mirror 30 is typically a function of the radius of curvature of the mirror 30. The radius of curvature can be defined by the following equation:

$$R = \frac{(E/2)^2}{2 \times (\text{Max deflection of the mirror})}$$

where R is the radius, and E is the optical power of the mirror. Also, the reflectivity value of the mirror is often a function of the cover layer and manufacturing process used to form the mirror 30. In order to maintain high reflectivity in the infrared region (such as in the 1.55 micrometer wave length region), the mirror 30 can be formed by a definition process with very low roughness.

In one exemplary embodiment, the radius of the circular mirror 30 can have a magnitude of 70 microns and a thickness of 0.5 microns. Also, in another exemplary embodiment, the amount of deflection of the optical element 30 falls preferably between minus one and plus one degrees for the respective switching directions. Optical element 30 can further include one or more tabs 32 that are designed to contact the substrate 24 after movement of the optical element 30. The tabs 32 are designed to prevent the optical element 30 from contacting the substrate 24.

Figure 2:
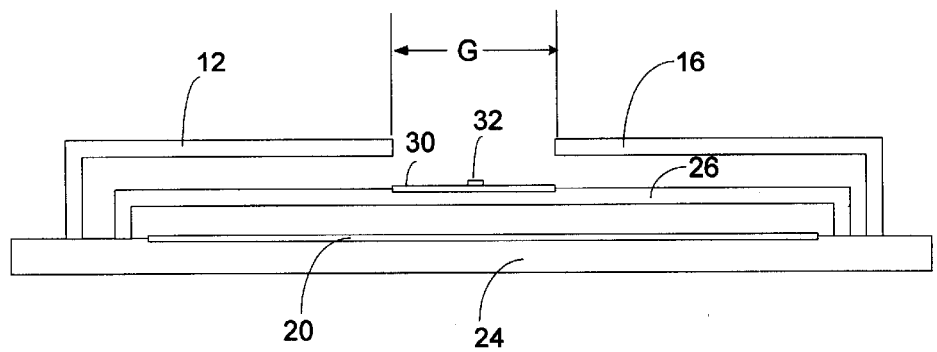
FIG. 2 is a side view of the optical switching device illustrated in FIG. 1.

Referring now to FIG. 2, this diagram illustrates a side view of the optical switching device 10 illustrated in FIG. 1. In this diagram, the geometric shapes and relative spacings for the electrodes 12, 16, (as well as the other electrodes 14, 18) can be ascertained. Also, the relative geometry of the membrane support 26 can also be ascertained. In this exemplary embodiment, the electrodes 12, 16 spaced from the substrate 24 have a substantially "L" shape cross-section. The membrane support 26 has a substantially "C" shape cross section. However, the present invention is not limited to these shapes illustrated in the drawings. The shape of the electrodes 12, 16 disposed apart from the substrate 24 are typically a function of how much light and at what angle light energy is to be received with the optical element 30. A space or gap G exists between electrodes 12, 16 (and likewise electrodes 14 and 18) so that optical or light energy can be reflected from the surface of optical element 30 when a light source (not shown) is spaced outside the electrodes 12, 14, 16, and 18.

Figure 10A:
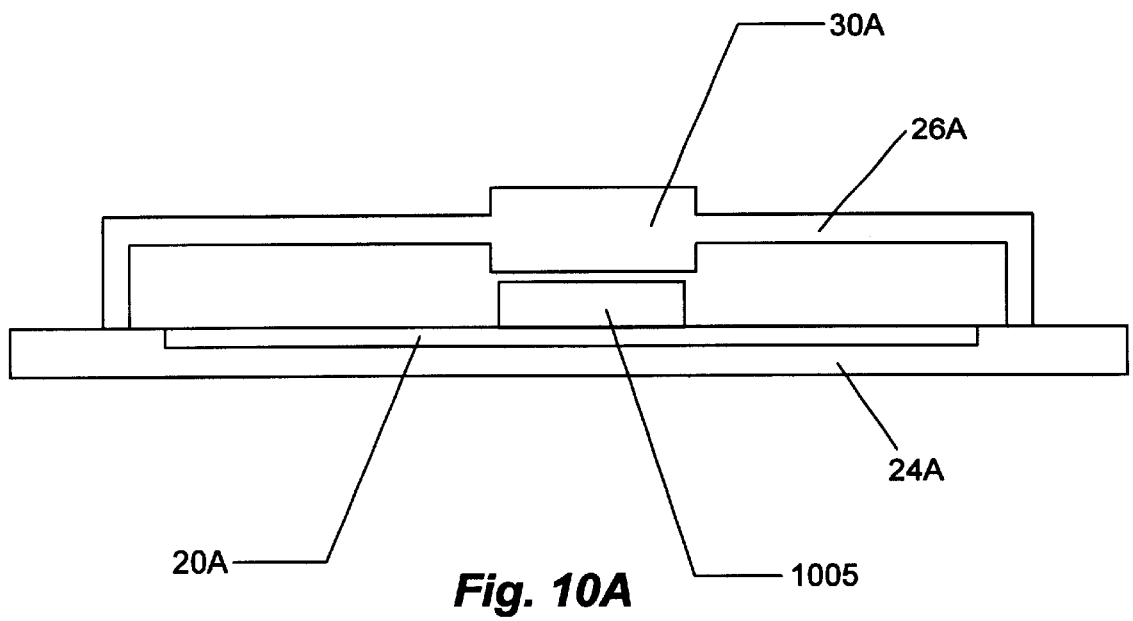
FIG. 10A is a side view of an optical switching device according to another exemplary embodiment in which a standoff is disposed under the optical element.
Figure 10B:
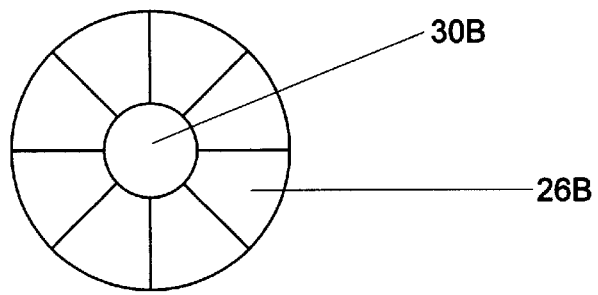
FIG. 10B is an elevational view of an optical switching device according to another exemplary embodiment in which the membrane supports are circularly shaped.
Figure 10C:
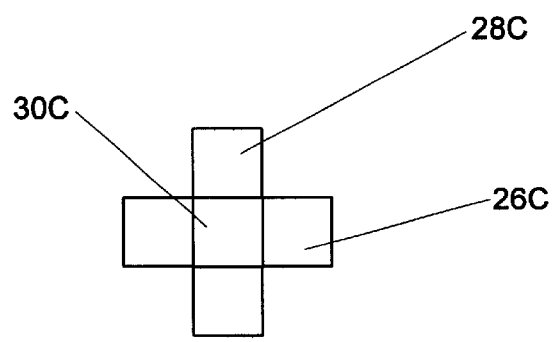
FIG. 10C is an elevational view of an optical switching device according to another exemplary embodiment in which membrane supports form a cross-shape.

The shape of the membrane support 26 can also be a function of the desired movement direction of optical element 30. For example, referring now to FIG. 10B, the membrane support 26 can have a substantially circular shape. In another exemplary embodiment, the position of the membrane supports 26, 28 can form a cross shape as illustrated in FIG. 10C.

Referring back to FIG. 2, the membrane supports 26, 28 can be disposed between respective pairs of electrodes such that substantially pure moments can be generated. Further details of the substantially pure moments generated by the present invention will be discussed in further detail with respect to FIG. 4 and FIG. 5.

The membrane supports 26, 28 can be designed to have low inertia and high stiffness. This combination of low inertia and high stiffness properties permit the membrane supports 26, 28 to move to their respective switching positions in a rapid manner. In one exemplary embodiment, the membrane supports 26, 28 can be manufactured with high stresses within the range of 100 to 300 MegaPascals (MPa). A membrane support with high stresses typically has increased stiffness so that it can provide rapid movement of the optical element 30 disposed on the membrane support.

The electrodes can be made from electrical conductors such as titanium nitride (TiN). For the electrodes 12, 14, 16, and 18 spaced from the substrate 24, these electrodes are spaced from the substrate 24 by portions made from silicon nitride. The substrate 24 can be made from dielectric materials such as Silicon. The membrane supports 26, 28 can comprise strips made from silicon nitride ($Si_3N_4$). However, other materials are not beyond the scope of the present invention. Other materials include, but are not limited to, polysilicon, and other like materials. The materials for the membrane supports 26, 28 typically have a high Young's modulus such as 300 GPa, and a yield stress that is above the range of 1–2 GPa. The membrane support materials typically will comprise a dielectric material with very high breakdown voltage strength. In other words, the membrane support materials work well with high voltages.

One benefit of the optical switching device 10 of the present invention is that it can be manufactured on silicon chips using well established, very-large scale integration (VLSI) complimentary metal-oxide semiconductor (CMOS) foundry processes. Further details of the manufacturing processes will be discussed below with respect to Table IV. The optical switching device 10 can be manufactured in high volume manufacturing environments and can form the basic building blocks for two-dimensional (2-D) and three-dimensional (3-D) optical switch architectures.

Referring now to FIG. 3, this diagram illustrates an elevational view of the optical switching device 10 illustrated in FIG. 1. In this drawing, both pairs of the electrodes 20, 22 disposed within the substrate 24 are illustrated with dashed lines. The electrodes 20, 22 are illustrated to have a smaller surface area relative to the membrane supports 26, 28 which are also illustrated with dashed lines to denote these hidden views. However, the present invention is not limited to electrodes 20, 22 having smaller surface areas relative to the membranes supports 26, 28. It is not beyond the scope of the present invention to design electrodes 20, 22 disposed within the substrate 24 to have surface areas larger than or substantially equal to their respective membranes supports 26, 28.

Also illustrated in FIG. 3 is a voltage source 34 for the electrodes. The voltage source 34 can be an electronic driver. For example, one electronic driver can comprise transistor-transistor-logic (TTL) drivers and associated electronic up converters to provide the required voltage levels for the electrodes 12, 14, 16, 18, 20, 22. When multiple optical switching devices are arranged in an array, the TTL drivers can be controlled by a computer device (not shown).

Figure 4:
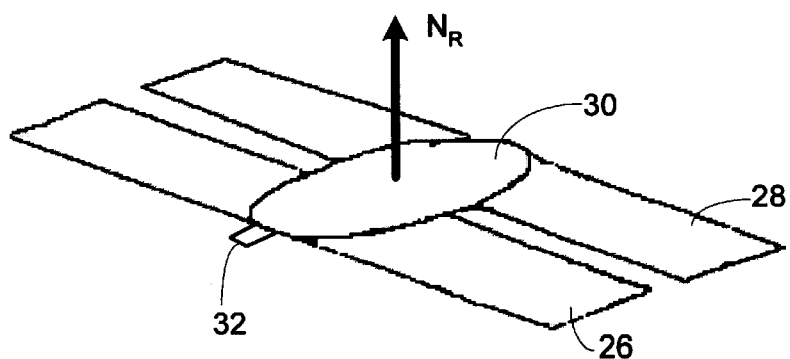
FIG. 4 is a diagram that illustrates a rest position and geometric normal of the optical element of an optical switching device when voltage is not applied to the electrodes.

FIG. 4 is a diagram that illustrates a rest position and geometric normal $N_R$ of the optical element 30 of the optical switching device 10 when voltage is not applied to the electrodes 12, 14, 16, 18, 20 and 22. It is noted that the rest position illustrated in FIG. 4 typically will not be utilized by the preferred exemplary embodiments. In the preferred exemplary embodiments, the optical element 30 will be disposed in one of two possible switching positions which will be discussed in further detail below with respect to FIG. 5.

Figure 5:
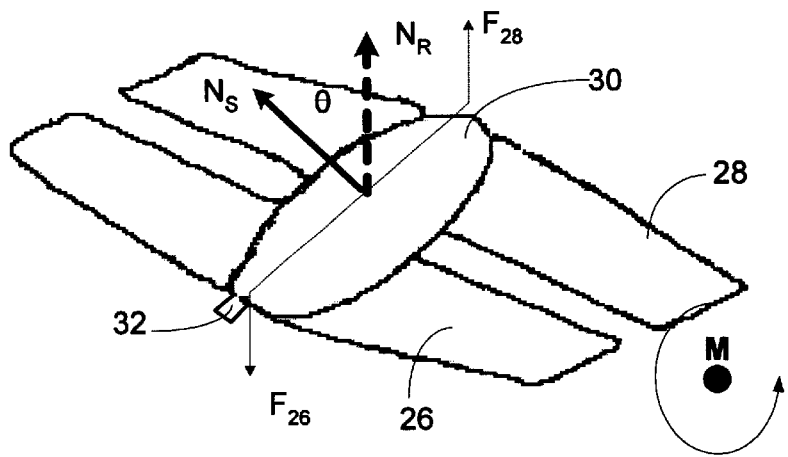
FIG. 5 is a diagram that illustrates an exemplary moment and switching direction or position relative to the geometric normal of the optical element of an optical switching device when moment voltage is applied to the electrodes.

Referring now to FIG. 5, this diagram illustrates an exemplary moment M and switching direction or position relative to the geometric normal $N_R$ of the optical element 30 when a voltage is applied to predetermined electrodes. In this figure, the optical element 30 has been tilted by an angle theta (θ), where theta (θ) is defined by the geometric normal $N_R$ when the optical element is at a rest position and by the geometrical normal $N_S$ when the optical element is in a switching position. In FIG. 5, the z direction is magnified in order to observe the small movement of the optical element 30 and membrane supports 26, 28. The optical element 30 in FIG. 5 has been rotated in a counter-clockwise direction because of the moment M produced by the two parallel forces $F_{26}$ and $F_{28}$. A couple moment is usually defined as two parallel forces that have the same magnitude, opposite directions, and are separated by a distance. Since the resulting force of the two forces comprising the couple is zero, the only effect of the couple is to produce a rotation or tendency of rotation in a specified direction. A moment produced by a couple, called a couple moment, is equivalent to the sum of the moments of both couple forces computed about any arbitrary point in space.

The force $F_{28}$ of the couple is produced when the membrane support 28 is pulled toward the electrodes 14, 18 because of the electrostatic force generated when a voltage is applied to electrodes 14, 18. Similarly, the force $F_{26}$ of the couple is produced when the membrane support 26 is pulled towards the electrode 20 disposed within the substrate 24 when a voltage is applied to the electrode 20. As noted above, the switching position illustrated in FIG. 5 is but one of two possible switching positions for the optical element 30. The other switching position (not illustrated) occurs when the membrane supports 26, 28 are deflected in opposite directions relative to those shown in FIG. 5.

The tilting angle theta (θ) illustrated in FIG. 5 is typically very small. For example, the tilting angle theta (θ) is typically within the range of 0 to 3 degrees or more. In one exemplary embodiment, the tilting angle theta can be one degree such that the two switching positions would comprise the plus one degree and minus one degree positions. With two such defined positions, accurate, repeatable, and rapid switching speeds can be achieved.

Switching time for the optical switch 10 of the present invention can be defined as the time to move the optical element 30 from a first switching position (illustrated in FIG. 5) to a second switching position (not shown, but opposite to FIG. 5). The switching time of the present invention can be designed to fall within a range of 30 to 50 nanoseconds. However, the present invention is not limited to these exemplary switching times. For example, the present invention can also operate with switching times designed for microsecond switching environments.

As noted above, in order to reduce the velocity of the optical element 30 when the optical element 30 reaches its switching position, an absorption mechanism or material such as tab 32 can be employed. Other absorption mechanisms for the optical element 30 can include a base with a flexible spring or some polymer which can absorb the impact energy at the end of the rotation of the optical element 30. Also, in order to substantially reduce or prevent permanent contact between the optical element 30 and the substrate 24, the present invention can employ dimples (not shown) on the edge of the optical element 30.

In order to substantially reduce or avoid permanent contact between the membranes supports 26, 28 and the substrate 24, the present invention can also utilize anti-stiction coatings. Further, dimples (not shown) can also be disposed on the membranes supports 26, 28 in order to substantially reduce or eliminate permanent contact between the membranes supports 26, 28 and the substrate 24.

Referring now to both FIGS. 3 and 5, the forces $F_{26}$ and $F_{28}$ can be produced by applying voltages to opposing electrodes of the present invention. More specifically, to produce the forces $F_{26}$ and $F_{28}$ of FIG. 5, voltages are applied to electrodes 14, 18 and electrode 20. When voltage is applied to electrodes 14, 18 the membrane support 28 is pulled in a direction towards electrodes 14, 18 which is also in a direction away from the substrate 24. When a voltage is applied to electrode 20 disposed within the substrate 24, the membrane support 26 is pulled towards the electrode 20 which is also a direction moving into substrate 24. Applying voltage to these particular electrodes moves or rotates optical element 30 to a first switching position. The second switching position (not shown) can be achieved when voltage is applied to electrodes 12, 16 and electrode 22 disposed within the substrate 24.

In one exemplary embodiment, a bias voltage can be applied to all of the lower substrate electrodes such as lower electrodes 20, 22 of the present invention in order to stabilize the optical element 30 and to increase the sensitivity of the membrane supports 26, 28 to the voltage applied to move the membrane supports 26, 28. In a further exemplary embodiment, as illustrated in FIG. 10A, a standoff 1005 can be positioned under the optical element 30A. When the bias voltage is not applied to the lower electrodes 20, 22, a separation distance can exist between the optical element 30A and the standoff 1005 as illustrated in FIG. 10A. When a bias voltage is applied to the lower electrodes 20, 22, then the optical element 30A will contact the standoff 1005 (contact not shown in FIG. 10A). This bias voltage can be applied at all times, even when a voltage greater than the bias voltage is applied to respective pairs of upper electrodes such as upper electrodes 12, 16 or 14, 18 (not shown in FIG. 10A) and lower electrodes 20, 22. By applying the bias voltage, the membrane supports 26, 28 and optical element 30A are more stabilized between switching positions. Further, the movement of the supports 26, 28 and optical element 30A is more controlled and less susceptible to vibration.

The present invention is also not limited to the actuation or activation of electrodes discussed above. That is, other combinations of activating particular electrodes can be achieved with the present invention such that additional ranges of motion of the optical element 30 are obtained. For example, instead of activating pairs of upper electrodes, such as electrodes 14, 18 in unison, a single electrode such as electrode 14 could be activated to impose a different movement direction of membrane support 28 compared to the movement direction of membrane support 28 when both electrodes 14, 18 are activated.

The present invention is not limited to electrostatic actuation of the membrane supports 26, 28. Other actuation methods include piezoelectric and magnetic actuation. For the piezoelectric method, a piezo thin film can be sandwiched between two electrodes and can be placed on top of a silicon cantilever beam. When a voltage supplied across the piezoelectric film, the film can expand or contract in the lateral direction, resulting in downward or upward deflection, respectively, of the cantilever. For magnetic actuation, magnetic materials and fabrications of windings are employed. Another actuation method includes thermal micro actuation where the membrane supports 26, 28 can be fabricated from bimetallic or shape memory alloys (SMA). A heating resistor can be placed adjacent to the bimetallic membrane supports such that when the heating resistor is activated, metal portions of the bimetallic membrane supports 26, 28 will expand in response to this heating.

Figure 6A:
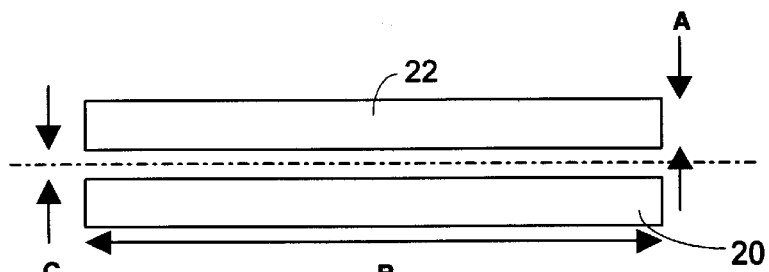
FIG. 6A is a diagram that illustrates exemplary lower electrodes according to the present invention.
Figure 6B:
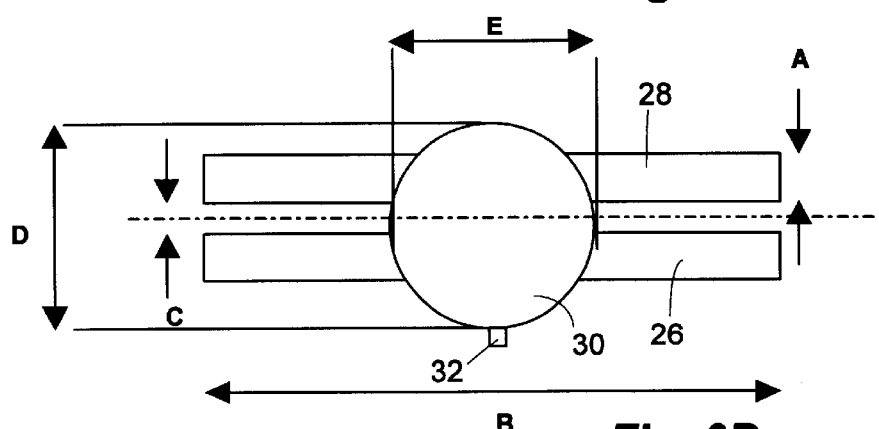
FIG. 6B is a diagram that illustrates an exemplary optical element and membrane supports according to the present invention.
Figure 6C:
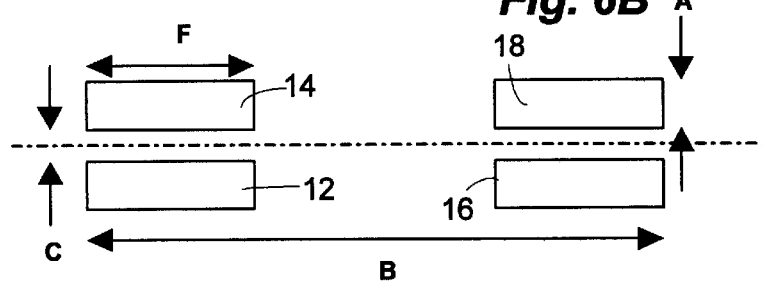
FIG. 6C is a diagram that illustrates exemplary optical upper electrodes according to the present invention.

Referring now to FIGS. 6A, 6B, 6C, exemplary dimensions of one preferred and exemplary embodiment are illustrated. The reference letters listed in these figures correspond to Table II which lists the respective values of the dimensions in microns. The present invention is not limited to these exemplary dimensions. These dimensions are merely provided to demonstrate the micro environment in which the optical switch 10 can be employed. Although the optical switch 10 appears to have shapes that are similar to engineering structures with conventional orders of magnitude (such as feet or inches) the function of the optical switch 10 is governed by forces that do not effect traditional machines or engineering structures. The optical switch 10 is subject to atomic forces and surface science as opposed to gravity or typical inertia.

TABLE II

Exemplary Dimensions

| Dimension | Description | Value (microns) |
| --- | --- | --- |
| A | Bottom and top electrode widths, membrane width | 30 |
| B | Bottom and top electrode lengths, membrane length | 300 |
| C | Distance between electrodes | 10 |
| D | Mirror major diameter | 75 |
| E | Mirror minor diameter | 70 |
| F | Top electrode length | 110 |
| G | Bottom electrode thickness | 0.1 |
| H | Gap - bottom electrode to membrane | 1.0 |
| J | Membrane thickness | 0.1 |
| K | Gap - top electrode to membrane | 1.0 |
| L | Mirror thickness | 0.5 |
| M | Top electrode thickness | 3 |

Figure 7:
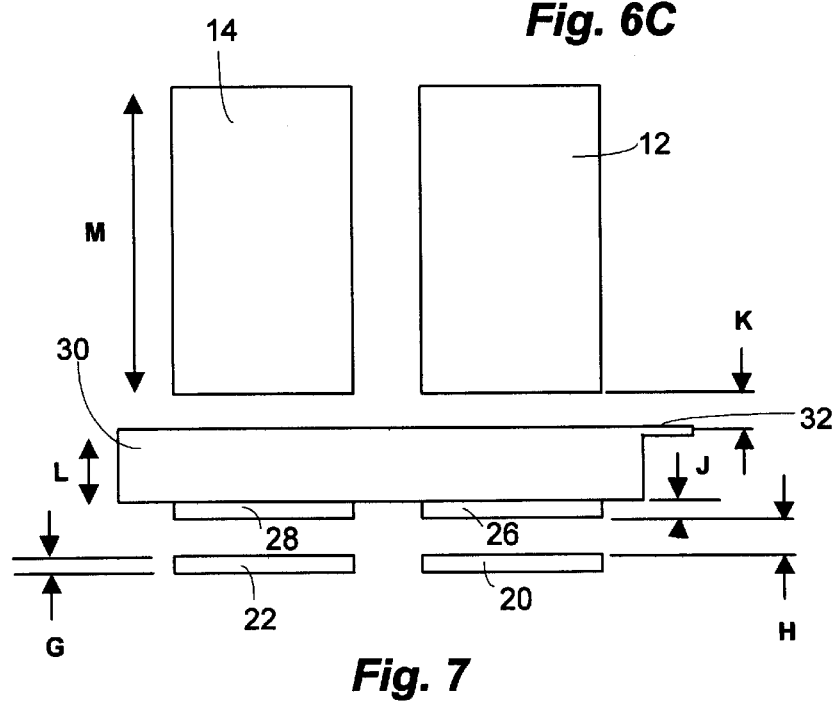
FIG. 7 is an exemplary cross-sectional view of the optical switching device taken along the cut line 7—7 of FIG. 3.

Referring now to FIG. 7, this figure illustrates an exemplary cross-sectional view of the optical switching device 10 taken along the cut line 7—7 of FIG. 3. This figure attempts to illustrate the relative thicknesses of materials employed by the present invention. The reference letters provided in this figure are also referenced in Table II listed above. The sizes of the structures illustrated in FIG. 7 have been drawn to illustrate the sizes of the structures relative to one another. However, the relative sizes have been exaggerated and not may be accurately depicted when comparing FIG. 7 to the values in Table II listed above.

Figure 9:
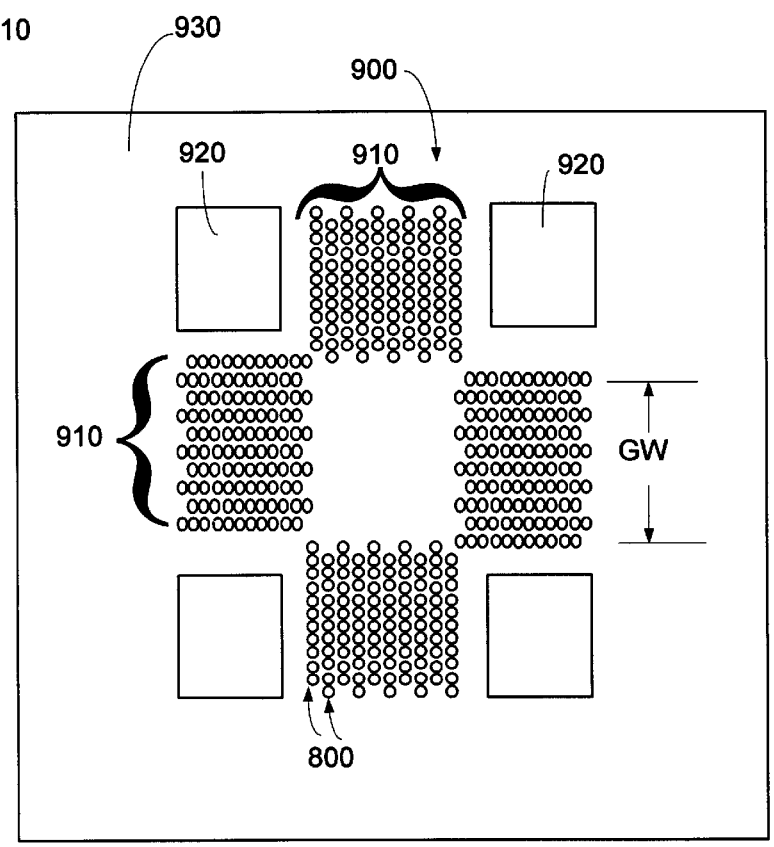
FIG. 9 is a diagram illustrating an exemplary planar array of optical switching devices according to the present invention.

Exemplary geometrical tolerances for the components of the optical switch 10 are given below in Table III.

define an amount of rotation about a center axis of respective optical elements 30. The exemplary linear array port 800 can form the building blocks of larger, more robust planar arrays 900 as illustrated in FIG. 9.

The orientation of the optical switching devices 10 of linear array 800 are typically a function of the intended switching environment. That is, the orientation of the optical switching devices 10 of linear array 800 are dependent upon

TABLE III

Exemplary Tolerances

| Dimension | Description | Dim + Tol [μm] | Remarks |
|---|---|---|---|
| Size | | 70 ± 0.5 | Elliptical mirror |
| Thickness | | 0.5 ± 0.1 | For the mirror |
| Roughness | | ±20 □ nm | |
| Position | | ±1 | x, y direction between two elements |
| Planar Angle | | ±0.5 mrad | Between two elements |
| Tilting Angle | | ±0.5 mrad | This is the determine by the accuracy of the studs |
| Length | | ±1 | For the membranes and the electrodes |
| Width | | ±1 | For the membranes and the electrodes |

Figure 8:
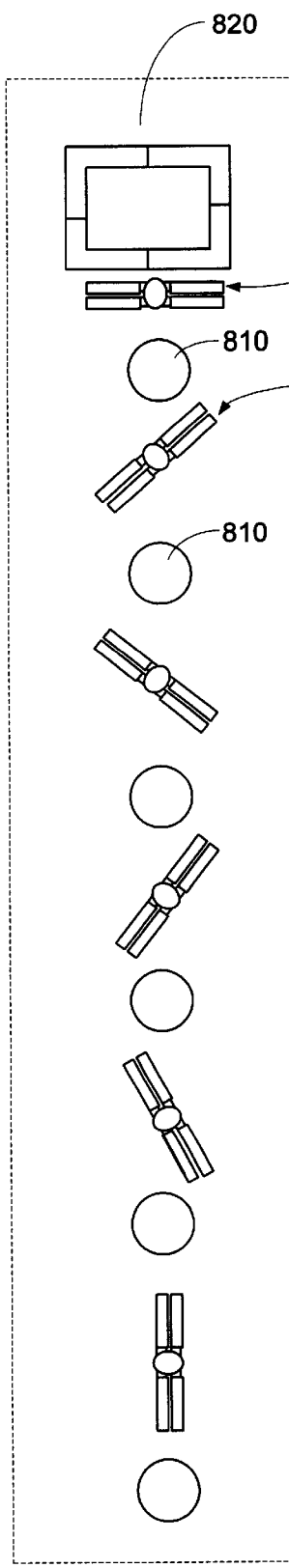
FIG. 8 is a diagram illustrating an exemplary linear array of optical switching devices according to the present invention.

FIG. 8 illustrates an exemplary linear array 800 that comprises a plurality of optical switching devices 10 of the present invention. The exemplary linear array 800 can further comprise static mirrors 810 and a tuning or a folding mirror 820. The tuning mirror 820 can be manufactured according to the same manufacturing processes for the optical switching devices 10. In one exemplary embodiment, each static mirror 810 can comprise a reflective coating on a substrate. Further, each static mirror 810 can have an exemplary diameter of 300 microns. Each static mirror 810 can also be fabricated from thin gold layers having a thickness of 0.1 microns. The linear array 800 can also be referred to as a port. Each optical switching device 10 of the exemplary linear array or port 800 can be oriented at a different angle relative to a neighboring optical switching device 10. In other words, the optical switching devices 10 of the exemplary linear array or port 800 are oriented at different angles relative to each other, where the angles the orientation of the respective optical wave guides that receive and transmit optical signals to the optical switching devices 10. The exemplary linear array 800 can comprise six optical switching devices 10, six static mirrors 810, and one tuning mirror 820. However, the present invention is not limited to this exemplary configuration. Additional or fewer optical switching devices 10, static mirrors 810, and tuning mirrors 820 can be employed depending upon the application of the linear array or port 800.

Referring now to FIG. 9, this diagram illustrates an exemplary planar array 900 that may be also referred to as a die. The planar array 900 includes a plurality of groupings 910 of linear arrays 800. The planar array 900 further includes pads 920 that comprise the electrical interface between the planar array 900 and the voltage sources 34. The pads 920 can be connected to the voltage source 34 by techniques such as wire bonding. The pads 920 can have dimensions of 120×120 microns.

A number of ports or linear arrays 800 within each grouping 910 of the planar array 900 is illustrated in FIG. 9.

However, the present invention is not limited to this exemplary embodiment. The number of linear arrays or ports 800 is typically a system parameter and can fall between a range of 32 to 256 ports. However, the present invention is not limited this exemplary range of ports. Additional or fewer ports are not beyond the scope of the present invention. For the planar array 900 illustrated in FIG. 9, each grouping 910 has a grouping width GW of approximately eleven (11) millimeters.

As noted above, the number of linear arrays or ports 800 is usually a system parameter. The linear arrays 800 can form the building blocks for two-dimensional (2-D) or digital designs and a three-dimensional (3-D) or analog designs. The planar array 900 forms a 2-D digital approach because the optical switches 10 are arranged in a planar fashion and because the optical switches can be either of two known positions (on or off) at any given time. With this approach, the planar array 900 can be used to connect to N input fibers to N output fibers.

For example, a switch matrix according to the present invention can comprise at least 40 channels—40×40 I/O. Each channel can further comprise six tilting mirrors. Port 800 can also be referred to as a channel which comprises the six tilting mirrors. Port 800 can be referred to as a switch that is capable of deflecting light to 40 different places. Each channel can comprise one switch, which may further comprise six mirrors.

In the 3-D analog or beam-steering design, two arrays of N optical switches are used to connect N input to N output fibers. In this approach, each optical switch has multiple possible switching positions of at least N positions.

Figure 10D:
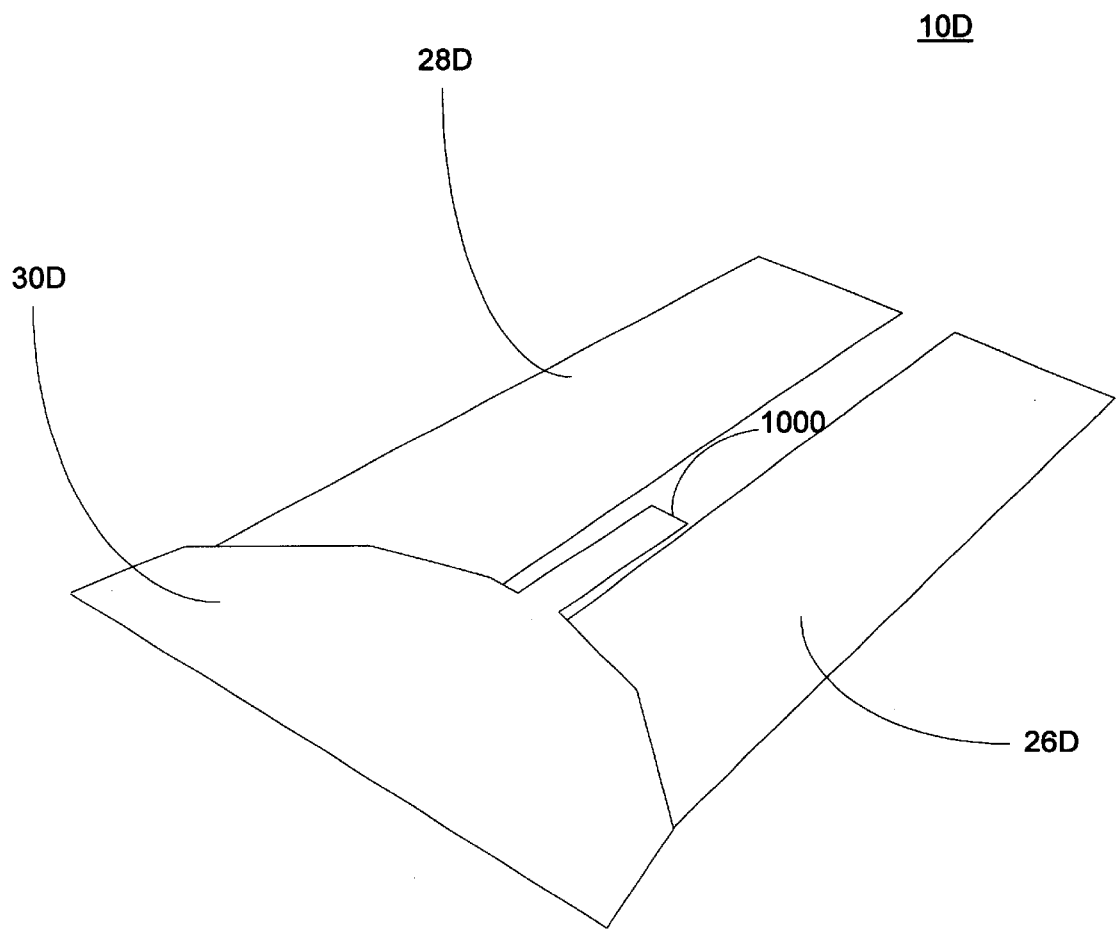
FIG. 10D is a perspective view of an optical switching device according to another exemplary embodiment in which a spring is disposed between two membrane supports.

Referring now to FIG. 10D, this diagram illustrates an optical switching device 10D according to another exemplary embodiment. Optical switching device 10D of FIG. 10D comprises an optical element 30D that includes a spring 1000 disposed between the membrane supports 28D, 26D. Spring 1000 is designed to stabilize the movement of the optical element 30D in a direction that is perpendicular to the tilting direction to permit for more tilting and less deflection or translational movement of the optical element 30D.

Figure 11:
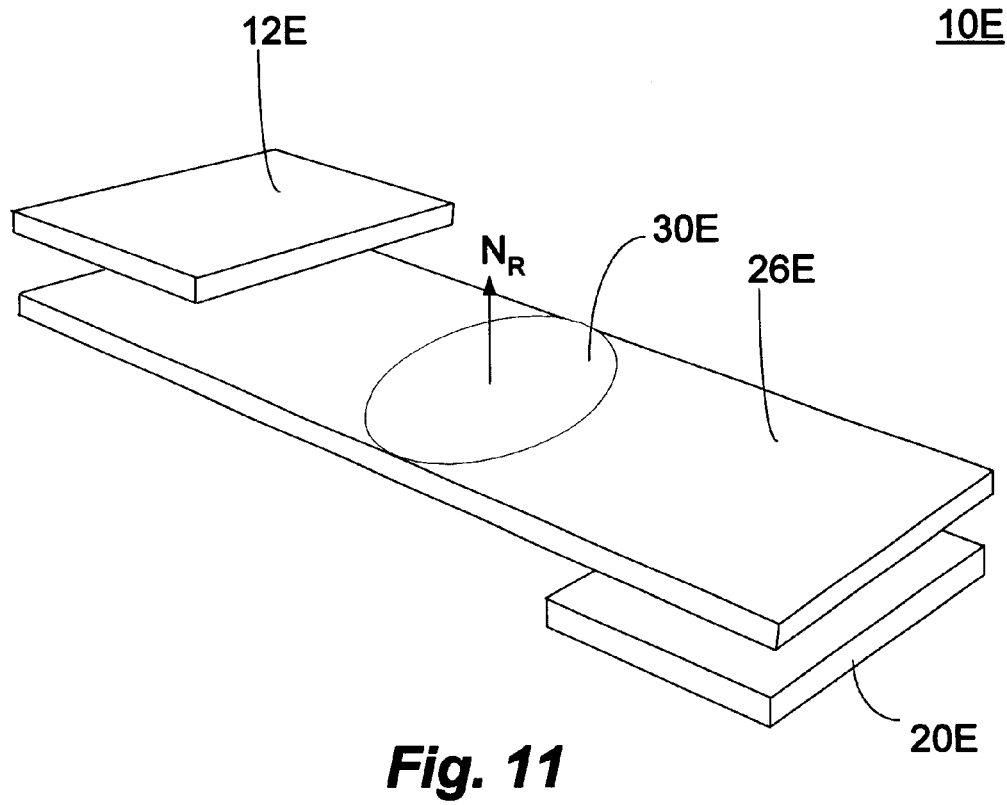
FIG. 11 is a diagram that illustrates a rest position and geometric normal of an optical element for an optical switching device of another exemplary embodiment when voltage is not applied to a pair of electrodes.
Figure 12:
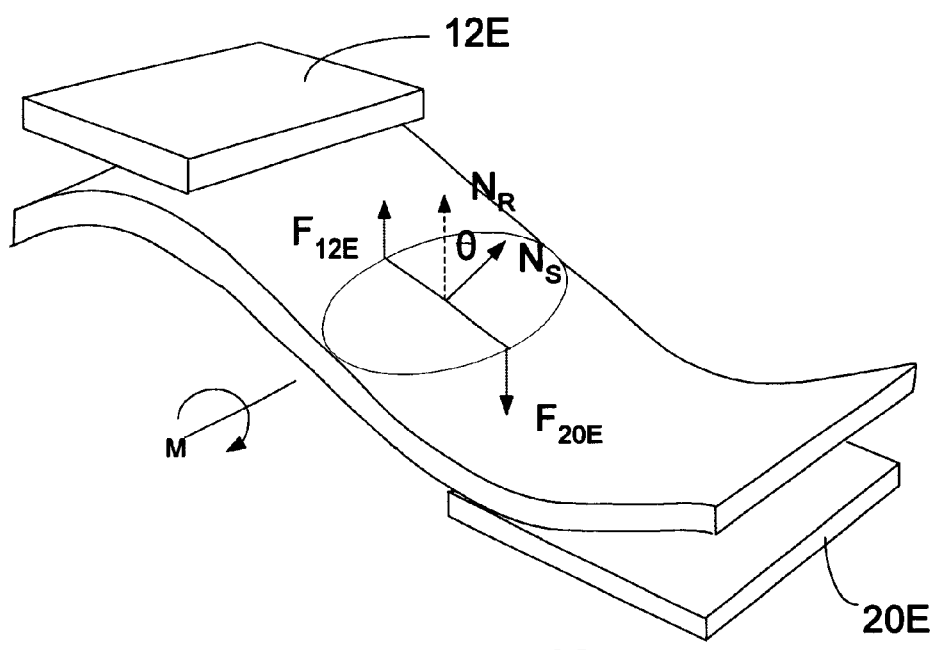
FIG. 12 is a diagram that illustrates an exemplary moment in switching direction or position relative to the geometric normal of the optical element of an optical switching device when moment voltage is applied to the pair of electrodes.

Referring now to FIGS. 11 and 12, these diagrams illustrate respective rest positions and switching directions of an optical switching device 10E according to another exemplary embodiment. Specifically, in FIG. 11, this diagram illustrates a rest position and a geometric normal of an optical element 30E of the optical switching device 10E when tilting voltage is not applied to the electrodes 12E and 20E. In this exemplary embodiment, the optical element 30E is supported by a single membrane support 26E. However, the present invention is not limited to the number and sizes of the membrane supports illustrated. Additional membrane supports are not beyond the scope of the present invention.

Referring now to FIG. 12, this diagram illustrates a switching position in which the optical element 30E is tilted or rotated along its major axis. A tilting voltage is applied to both the electrodes 12E and 20E. The application of the tilting voltage produces forces $F_{12B}$ and $F_{20B}$ that also form a couple. The couple also generates a moment M that has an axis that coincides with the major access of the optical element 30E. The optical element 30E is rotated by a predetermined angle theta ($\theta_B$). The angle theta ($\theta_B$) is defined by the geometric normal at a rest position $N_R$ and the geometric normal $N_s$ of the optical element 30E at the switching position.

TABLE IV

Exemplary Manufacturing Steps

| # | Process | DESCRIPTION | Requirements |
|---|---|---|---|
| 1 | Thermal Oxide Passivation | Grown on the wafer | High: 0.5 $\mu$ Material: $SiO_2$ |
| 2 | LPCVD | Deposition of metal layer for the lower electrodes. | High: 0.1–0.2 $\mu$m Material: W |
| 3 | RIE | Etching the Metal layer to get the lower electrodes and electronics contact pads. | Stopper Layer: $SiO_2$ |
| 4 | LPCVD | Deposition base layer. | High: 0.7 $\mu$m Materials: $Si_3N_4$ |
| 5 | RIE | Etching the $Si_3N_4$ to get the standoff and the wells. | Stopper Layer: $SiO_2$. |
| 6 | LPCVD | Deposition of $SiO_2$ layer. | High: 1.2 ± 0.05 $\mu$m Material: $SiO_2$ |
| 7 | CMP | Polishing for the lower side of the mirror. | Flatness: 0.1 $\mu$/ 100 mm |
| 8 | RIE | Etching the $SiO_2$ for the mirror base. | Deep: 0.25 ± 0.05 $\mu$m Stopper Layer: Timing Roughness: 10 nm |
| 9 | LPCVD | Deposition of the mirror layer. | High: 0.5 $\mu$m Materials: $Si_3N_4$ Roughness: 10 nm |
| 10 | RIE | Etching the $Si_3N_4$ for the mirror base. | Stopper Layer: $SiO_2$ |
| 11 | LPCVD | Deposition of $Si_3N_4$ layer. | High: 0.1 ± 0.01 $\mu$m Materials: $Si_3N_4$ Roughness: 10 nm |
| 12 | RIE | Etching of the membrane. | Stopper Layer: $SiO_2$ |
| 13 | LPCVD | Deposition of scarification Silicon oxide layer. | High: 1 $\mu$m Materials: $SiO_2$ |
| 14 | RIE | Etching the $SiO_2$ for membrane. | Stopper Layer: $Si_3N_4$ |
| 15 | LPCVD | Deposition of $Si_3N_4$ layer for the membrane bases. | High: 2 ± 0.01 $\mu$m Materials: $Si_3N_4$ |
| 16 | RIE | Etching the $Si_3N_4$ | Stopper Layer: $SiO_2$ |
| 17 | RIE | Etching the $SiO_2$ to make a connection to the membrane. | Stopper Layer: $Si_3N_4$ |
| 18 | Evaporation + Liftoff | Deposition the membrane electrodes. | High: 0.05 Material: Ti |
| 19 | LPCVD | Deposition the sacrificial layer between the membrane and the upper electrodes. | High: 0.8 +/− 0.05 $\mu$m Material: $SiO_2$ |
| 20 | RIE | Etching the $SiO_2$ to make a connection to the $Si_3N_4$ base. | Stopper Layer: $Si_3N_4$ |
| 21 | LPCVD | Insulation layer of the upper electrodes. | High: 0.1 Material: $Si_3N_4$ |
| 22 | RIE | Etching the Upper electrodes insulation layer. | Stopper Layer: $SiO_2$ |
| 23 | Evaporation + Liftoff | Deposition the upper electrodes. | High: 2–3 $\mu$ Materials: Ti |
| 24 | RIE | Etching the $SiO_2$ for the Au. | Stopper Layer: $Si_3N_4$ |
| 25 | Evaporating + Liftoff | Deposition of Cr/Ti/Au | High: 0.1 $\mu$ Materials Cr/Ti/Au Roughness: 10 nm |
| 26 | Wet-Etching (SAM) | Removing of sacrificial materials from the device. | Materials: $SiO_2$ |

The following are definitions for the acronyms employed in Table IV:
LPCVD - Low pressure chemical vapor deposition
RIE - Reactive Ion etching
CMP - Chemical mechanical processing
SAM - Self assembled monolayer which typically comprises an antistiction coating with thickness of several atoms.

The present invention is not limited to the manufacturing steps listed in Table IV. Table IV merely provides one suggested technique of manufacturing the optical switching device 10 of the present invention.

Figure 13:
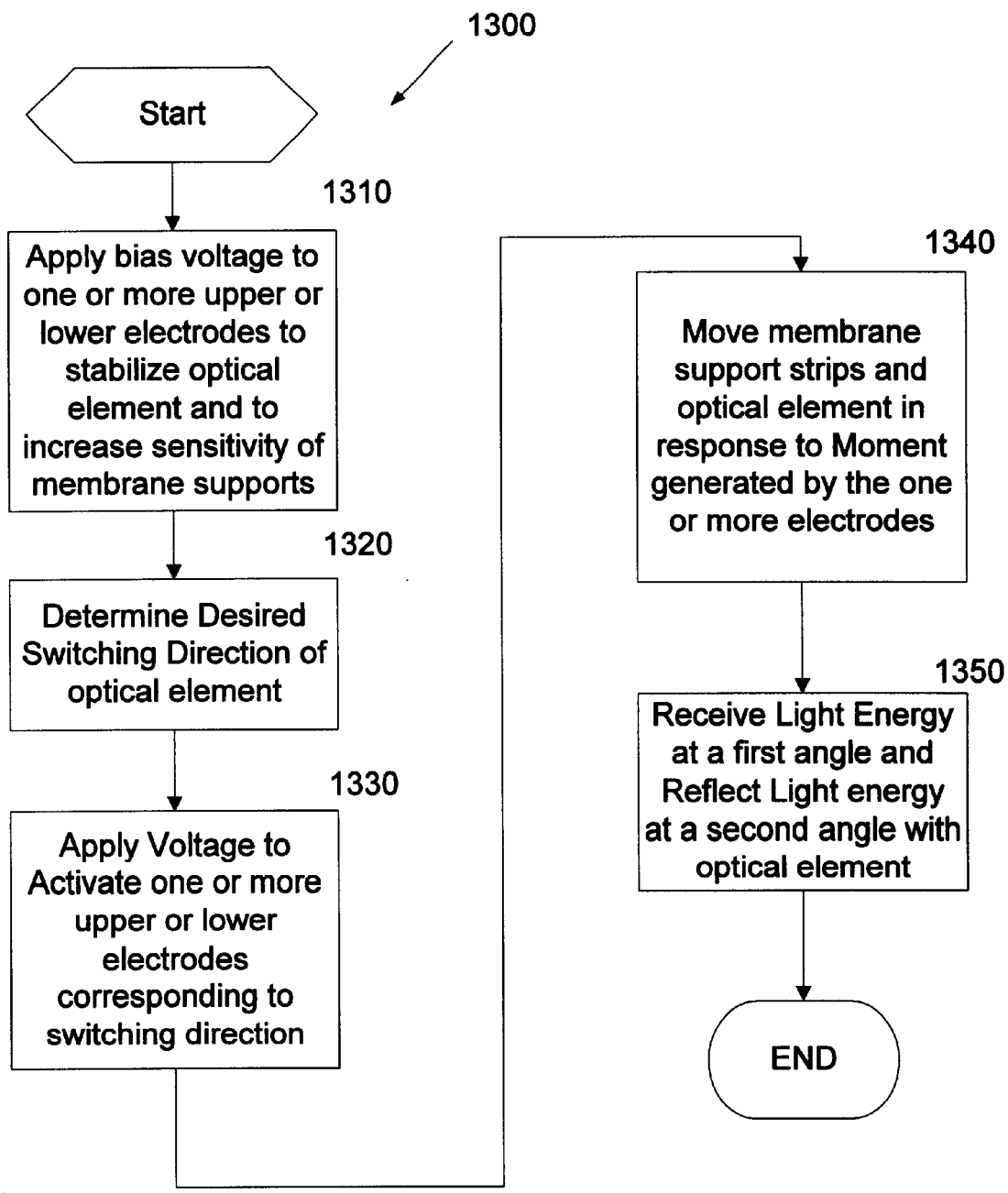
FIG. 13 is a logic flow diagram illustrating a process for increasing the speed and precision at which optical signals are switched within an optical network in accordance with an exemplary embodiment of the present invention.

FIG. 13 is a logic flow diagram illustrating a process 1300 for switching optical signals. Process 1300 starts with step 1310 in which a bias voltage is applied to one or more upper or lower electrodes 12, 14, 16, 18, 20 or 22 in order to stabilize an optical element 30 and to increase sensitivity of the membrane supports 26, 28 to a tilting voltage. In other words, the bias voltage 10 provides for rapid deflection of the membrane supports 26, 28 because of the increased sensitivity of the membrane supports 26, 28.

In step 1320, a desired switching direction of the optical element 30 is determined. Next, in step 1330, a tilting voltage usually greater than the bias voltage is applied to one or more upper or lower electrodes to correspond with the switching direction. Next, in step 1340, the membrane supports 26, 28 move or deflect in response to the electrostatic attraction between the membrane supports 26, 28 and respective activated electrodes 12, 14, 16, 18, 20 and 22 as a result of the applied tilting voltage. Equal and opposite forces generated by respective electrodes produce a moment which acts upon the membrane supports 26, 28 and the optical element 30. Next in step 1350, light energy is received at the first angle and the received light energy is reflected at a second angle theta which is defined by the switching position of the rotated optical element 30.

With the present invention, an optical switch provides at least two well-defined switching positions that allows very accurate and very repeatable movement. The present invention can achieve very fast switching times compared to other optical switches in the conventional art. Such fast switching times are critical to optical telecommunication systems.

However, the present invention is not limited to optical telecommunication applications. Other applications include, but are not limited to, instrumentation applications, sensors, displays, adaptive optics, scanners, printers, data storage, microfluidics, RF applications, tunable lasers, and biomedical applications.

The present invention provides an optical switching device that has uniform low insertion loss while providing nano second switching times. The present invention can operate with low voltages and is insensitive to vibration and shock. The optical switch of the present invention is of a compact design that could be manufactured with well-established, very-large-scale integration (VLSI) complementary metal-oxide semi-conductor (CMOS) foundry processes.

It should be understood that the foregoing relates only to the illustrated embodiments of the present invention and that numerous changes may be made therein without departing from the spirit and scope of the invention that are defined by the following claims.

What is claimed is:

1. An optical device comprising:
   a substrate;
   an optical element;
   at least one membrane support positioned on the substrate for spacing the optical element from the substrate, each of said at least one membrane support having two sides, a first side adjacent to the optical element and a second side opposite to said first side, each membrane support being stressed to between about 100 MPa and about 300 MPa;
   a first electrode disposed adjacent to the first side of a respective one of said at least one membrane support;
   a second electrode disposed adjacent to the second side of a respective one of said at least one membrane support, said first and second electrodes generating a moment upon activation of the electrodes, the moment moving a respective membrane support and moving the optical element to a predetermined angle such that incoming optical signals are reflected by the optical element at the predetermined angle during a predetermined time interval.

2. The optical switching device of claim 1, wherein the at least one membrane support is fabricated from silicon nitride.

3. The optical switching device of claim 1, wherein a bias voltage is applied to said first and second electrode for stabilizing and increasing an electrostatic sensitivity of the at least one membrane support when the at least one membrane support is in a switching position.

4. The optical switching device of claim 1, wherein each electrode produces an electrostatic force acting on a respective membrane support.

5. The optical switching device of claim 1, wherein the optical element comprises a mirror.

6. The optical switching device of claim 5, wherein in the mirror is fabricated from gold.

7. The optical switching device of claim 1, wherein the predetermined angle comprises an angle between zero and three degrees relative to a geometric normal of the optical element when the optical element is in a rest position.

8. The optical switching device of claim 1, further comprising a third and a fourth electrode, the third electrode being positioned adjacent to said first electrode, and the fourth electrode being positioned adjacent to said second electrode.

9. An optical system comprising:
   a substrate; and
   at least one optical switching array, each array comprising a grouping of linearly arranged optical switching devices, each optical switching device comprising:
   an optical element;
   at least one membrane support positioned on the substrate for spacing the optical element from the substrate, each of said at least one membrane support having two sides, a first side adjacent to the optical element and a second side opposite to said first side;
   a first electrode disposed adjacent to the first side of a respective one of said at least one membrane support; and
   a second electrode disposed adjacent to the second side of a respective one of said at least one membrane support, said first and second electrodes generating a moment upon activation of the electrodes, the moment moving the at least one membrane support and the optical element to a predetermined angle such that incoming optical signals are reflected by the optical element at the predetermined angle during a predetermined time interval;
   wherein each grouping of linearly arranged optical switching devices comprises a plurality of optical switching devices that are oriented at different angles relative to each other in a plane of said substrate.

10. The optical switching system of claim 9, wherein the membrane supports are fabricated from silicon nitride.

11. The optical switching system of claim 9, wherein each optical switching array forms an optical port for coupling with one or more optical waveguides.

12. The optical switching system of claim 9, further comprising a plurality of switching arrays, said switching arrays forming a die.

13. The optical switching system of claim 9, wherein the optical element comprises a mirror.

14. The optical switching system of claim 9, wherein each grouping of linearly arranged optical switching devices comprises one or more stationary mirrors.

15. The optical switching system of claim 14, wherein the one or more stationary mirrors are interposed between respective optical switching devices.

16. A method for switching optical signals, comprising the steps of:
  applying a first voltage to one or more electrodes to stabilize at least one membrane support that spaces a single respective optical element from a substrate;
  determining a switching direction;
  applying a second voltage to the one or more electrodes to create a moment acting on the at least one membrane support corresponding to the switching direction;
  moving the at least one membrane support and the optical element in response to the moment;
  receiving light energy with the optical element at a first angle; and
  reflecting the light energy with the optical element at a second angle.

17. The method of claim 16, further comprising the step of fabricating the at least one membrane support from silicon nitride.

18. The method of claim 16, wherein the step of moving the at least one membrane support, further comprises the step of moving the at least one membrane support such that the optical element tilts by a predetermined angle comprising an angle between zero and three degrees relative to a geometric normal of the optical element when the optical element is in a rest position.

19. The method of claim 16, wherein the optical element comprises a mirror, the method further comprising the step of fabricating the mirror from one or more layers of gold.

20. An optical device comprising:
  a substrate;
  an optical element;
  at least one membrane support positioned on the substrate for spacing the optical element from the substrate, each of said at least one membrane support having two sides, a first side adjacent to the optical element and a second side opposite to the optical element;
  a first electrode disposed adjacent to the first side of a respective one of said at least one membrane support;
  a second electrode disposed adjacent to the second side of a respective one of said at least one membrane support, said first and second electrodes generating a moment upon activation of the electrodes, the moment moving a respective membrane support and moving the optical element to a predetermined angle such that incoming optical signals are reflected by the optical element at the predetermined angle during a predetermined time interval; and
  an absorption mechanism for reducing a velocity of said optical element when said optical element reaches said predetermined angle.

21. An optical device comprising:
  a substrate;
  an optical element;
  at least one membrane support positioned on the substrate for spacing the optical element from the substrate, each of said at least one membrane support having two sides, a first side adjacent to the optical element and a second side opposite to the optical element;
  a first electrode disposed adjacent to the first side of a respective one of said at least one membrane support;
  a second electrode disposed adjacent to the second side of a respective one of said at least one membrane support, said first and second electrodes generating a moment upon activation of the electrodes, the moment moving a respective membrane support and moving the optical element to a predetermined angle such that incoming optical signals are reflected by the optical element at the predetermined angle during a predetermined time interval; and
  an anti-stiction coating to inhibit permanent contact between said at least one membrane support and said substrate.

22. An optical device comprising:
  a substrate;
  an optical element;
  at least one membrane support positioned on the substrate for spacing the optical element from the substrate, each of said at least one membrane support having two sides, a first side adjacent to the optical element and a second side opposite to the optical element, each said at least one membrane support including at least one dimple to inhibit permanent contact between said each at least one membrane support and said substrate;
  a first electrode disposed adjacent to the first side of a respective one of said at least one membrane support;
  a second electrode disposed adjacent to the second side of a respective one of said at least one membrane support, said first and second electrodes generating a moment upon activation of the electrodes, the moment moving a respective membrane support and moving the optical element to a predetermined angle such that incoming optical signals are reflected by the optical element at the predetermined angle during a predetermined time interval.

23. An optical device comprising:
  a substrate;
  an optical element;
  at least one membrane support positioned on the substrate for spacing the optical element from the substrate, each of said at least one membrane support having two sides, a first side adjacent to the optical element and a second side opposite to the optical element;
  a first electrode disposed adjacent to the first side of a respective one of said at least one membrane support;
  a second electrode disposed adjacent to the second side of a respective one of said at least one membrane support, said first and second electrodes generating a moment upon activation of the electrodes, the moment moving a respective membrane support and moving the optical element to a predetermined angle such that incoming optical signals are reflected by the optical element at the predetermined angle during a predetermined time interval; and
  a standoff between said optical element and said substrate.

24. An optical system comprising:
  a substrate; and
  at least one optical switching array, each array comprising a grouping of linearly arranged optical switching devices, each optical switching device comprising:
    an optical element;
    at least one membrane support positioned on the substrate for spacing the optical element from the substrate, each of said at least one membrane support having two sides, a first side adjacent to the optical element and a second side opposite to the optical element;
    a first electrode disposed adjacent to the first side of a respective one of said at least one membrane support; and a second electrode disposed adjacent to the second side of a respective one of said at least one membrane support, said first and second electrodes generating a moment upon activation of the electrodes, the moment moving the at least one membrane support and the optical element to a predetermined angle such that incoming optical signals are reflected by the optical element at the predetermined angle during a predetermined time interval;

wherein each grouping of linearly arranged optical switching devices comprises at least one static mirror.

25. The optical system of claim 24, wherein said at least one static mirror includes a reflective coating on said substrate.

* * * * *